(12) United States Patent
Hung et al.

(10) Patent No.: US 11,829,476 B2
(45) Date of Patent: Nov. 28, 2023

(54) COMPUTING DEVICE AND MODEL PARAMETERS SECURITY PROTECTION METHOD

(71) Applicant: HON HAI PRECISION INDUSTRY CO., LTD., New Taipei (TW)

(72) Inventors: Chien-Wen Hung, New Taipei (TW); Ta-Wei Chan, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 219 days.

(21) Appl. No.: 17/195,883

(22) Filed: Mar. 9, 2021

(65) Prior Publication Data
US 2021/0374271 A1    Dec. 2, 2021

(30) Foreign Application Priority Data

May 27, 2020   (CN) .......................... 202010462503.6

(51) Int. Cl.
| | |
|---|---|
| *G06F 21/57* | (2013.01) |
| *G06F 21/62* | (2013.01) |
| *G06N 3/08* | (2023.01) |
| *G06F 21/60* | (2013.01) |
| *G06F 18/21* | (2023.01) |

(52) U.S. Cl.
CPC .......... *G06F 21/57* (2013.01); *G06F 18/2193* (2023.01); *G06F 21/602* (2013.01); *G06F 21/6227* (2013.01); *G06N 3/08* (2013.01)

(58) Field of Classification Search
CPC .... G06F 21/57; G06F 18/2193; G06F 21/602; G06F 21/6227; G06N 3/08
See application file for complete search history.

(56) References Cited

U.S. PATENT DOCUMENTS

| | | | |
|---|---|---|---|
| 10,956,584 B1* | 3/2021 | Heaton | ................. G06F 9/3802 |
| 2011/0246768 A1* | 10/2011 | Mahmud | ............... H04L 9/0662 |
| | | | 713/167 |

FOREIGN PATENT DOCUMENTS

| | | |
|---|---|---|
| CN | 109040091 | 12/2018 |
| CN | 109495254 | 3/2019 |
| TW | 201117042 A1 | 5/2011 |
| TW | 201636905 A | 10/2016 |

* cited by examiner

*Primary Examiner* — Ayoub Alata
(74) *Attorney, Agent, or Firm* — ScienBiziP, P.C.

(57) ABSTRACT

A model parameters security protection method is implemented in a computing device in communication connection with at least one security protection device. The method includes training a data model based on an artificial neural network using a number of images and obtaining parameter information of the data model, encrypting the parameter information and generating a configuration file comprising the encrypted parameter information, and sending the configuration file to the at least one security protection device. The parameter information includes at least one of a weight of neuron and an offset value of the neuron of the artificial neural network.

11 Claims, 4 Drawing Sheets

COMPUTING DEVICE AND MODEL PARAMETERS SECURITY PROTECTION METHOD

FIELD

The subject matter herein generally relates to big data analysis, and in particular to a model parameters security protection method and a computing device implementing the model parameters security protection method.

BACKGROUND

Construction of a data model is a key part of data analysis, and parameter settings of the data model directly affect an analysis efficiency and accuracy of the data model. The existing data model may not protect the parameters of the data model during the application process, and there may be security problems such as data model parameter leakage.

BRIEF DESCRIPTION OF THE DRAWINGS

Implementations of the present disclosure will now be described, by way of embodiments, with reference to the attached figures.

DETAILED DESCRIPTION

Figure 1:
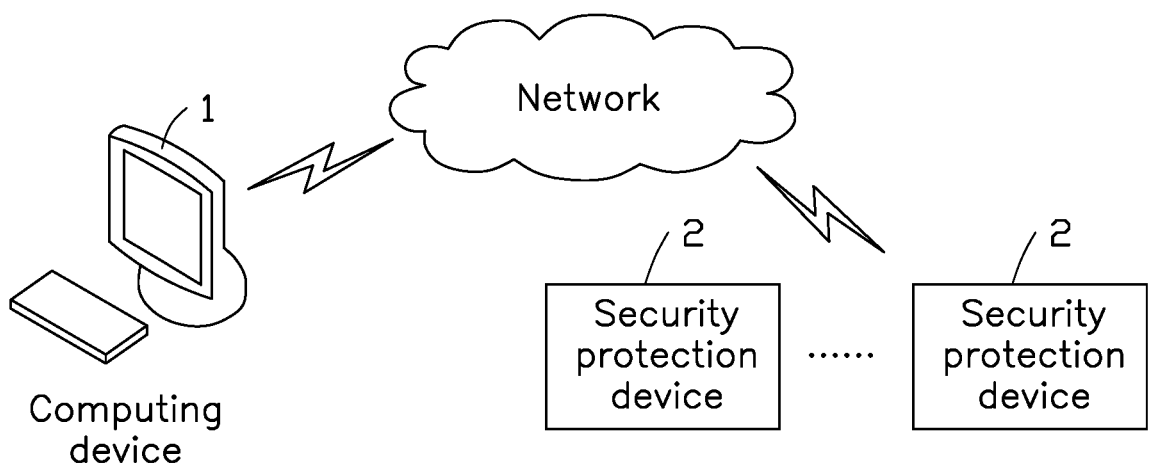
FIG. 1 is a schematic diagram of an application environment architecture of a model parameters security protection system.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to"; it specifically indicates open-ended inclusion or membership in a so-described combination, group, series, and the like.

Referring to FIG. 1, it is a schematic diagram of an application environment architecture of a model parameters security protection system.

The model parameters security protection system is applied to a computing device 1, and the computing device 1 establishes a communication connection with at least one security protection device 2 through a network. The network may be a wired network or a wireless network, such as radio, wireless fidelity (WIFI), cellular, satellite, broadcasting, or the like.

The computing device 1 is used for training a data model to obtain parameter information in the data model, encrypting the parameter information to generate a configuration file including the encrypted parameter information, and sending the configuration file to the security protection device 2. In one embodiment, the computing device 1 is also used to store sample information of the data model used for training. The sample information is used to train the parameters of the data model.

The security protection device 2 is used to receive the configuration file, search the encrypted parameter information in the configuration file, obtain a decryption key, decrypt the parameter information, and configure the parameter information in a data model.

The computing device 1 may be an electronic device, such as a personal computer, a server, etc., installed with a model parameters security protection software, wherein the server may be a single server, a server cluster, or a cloud server.

The security protection device 2 may be an electronic device, such as a single-chip microcomputer, a field-programmable logic gate array, a smart phone, a smart wearable device, a tablet computer, a laptop computer, a desktop computer, or the like installed with a model parameters safety protection software.

Figure 2:
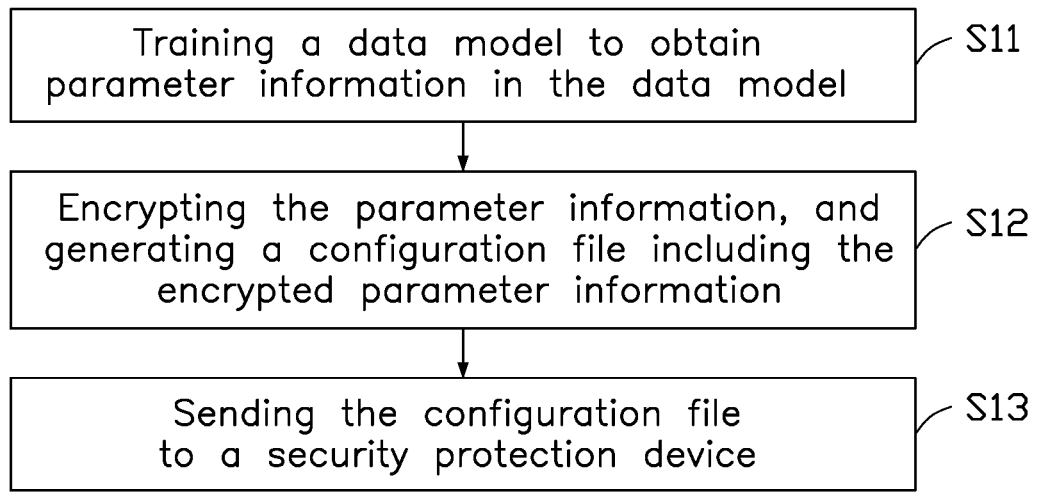
FIG. 2 is a flowchart of a first embodiment of a model parameters security protection method applied to a computing device.

FIG. 2 shows a flowchart of a first embodiment of a model parameters security protection method for protecting the security of model parameters of a computing device. According to different needs, the order of blocks in the flowchart can be changed, and some blocks can be omitted or combined.

At block S11, a data model is trained to obtain parameter information in the data model.

In one embodiment, the data model is a data model based on an artificial neural network. The parameter information includes one or more of a weight of a neuron of the artificial neural network and an offset value of the neuron.

In one embodiment, the data model is applied in a field of image detection to obtain feature information in an image to be detected, and a training process of the data model includes:

Acquiring a plurality of images with feature information;

Dividing the plurality of images into a training set and a verification set;

Establishing a data model based on an artificial neural network, and using the training set to train the data model based on the artificial neural network;

Verifying the trained data model according to the verification set based on the artificial neural network, and obtaining a model prediction accuracy based on a verification result;

Determining whether the model prediction accuracy of the model is less than a preset threshold;

In response that the model prediction accuracy is not less than the preset threshold, using the trained data model based on the artificial neural network as the data model for acquiring the feature information in the images to be detected, and extracting a weight of the neuron and an offset value of the neuron of the artificial neural network according to position information of the neuron;

In response that the model prediction accuracy is less than the preset threshold, adjusting the weight and/or the offset value of the neuron of the artificial neural network-based data model, and retraining the artificial neural network-based data model according to the training set;

Reverifying the retrained data model according to the verification set, and obtaining a model prediction accuracy according to a verification result of the retrained data model, and determining whether the model prediction accuracy of the retrained data model is less than the preset threshold;

In response that the model prediction accuracy of the retrained data model is not less than the preset threshold, the retrained data model is used as the data model for acquiring the feature information in the images to be detected;

In response that the model prediction accuracy of the retrained data model is less than the preset threshold, the above steps are repeated until the model prediction accuracy obtained by the verification set is not less than the preset threshold; and Obtaining the retrained data model based on the artificial neural network, and extracting the weight and offset value of the neuron in the retrained data model according to position information of the neuron.

At block S12, the parameter information is encrypted, and a configuration file including the encrypted parameter information is generated.

In one embodiment, block S12 further comprises binarizing the parameter information. The parameter information is compiled into binary code through a compiler.

An algorithm for encrypting the parameter information includes any one of a symmetric encryption algorithm and an asymmetric encryption mode. The symmetric encryption algorithm includes, but is not limited to, Data Encryption Standard (DES), International Data Encryption Algorithm (IDEA), and Advanced Encryption Standard (AES). The asymmetric encryption algorithm includes, but is not limited to, Rivest-Shamir-Adleman (RSA), ElGamal encryption, and Knapsack encryption.

The encrypted parameter information is generated according to format requirements of the compiler. The compiler includes, but is not limited to, C language, Python voice, and JAVA language.

At block S13, the configuration file is sent to the security protection device 2.

In one embodiment, block S13 may further include:

Receiving request information sent by the security protection device 2 to send the configuration file;

Determining whether the security protection device 2 has access privilege to the configuration file according to account information of the security protection device 2; and If the security protection device 2 has the access privilege, sending the configuration file to the security protection device 2.

Figure 3:
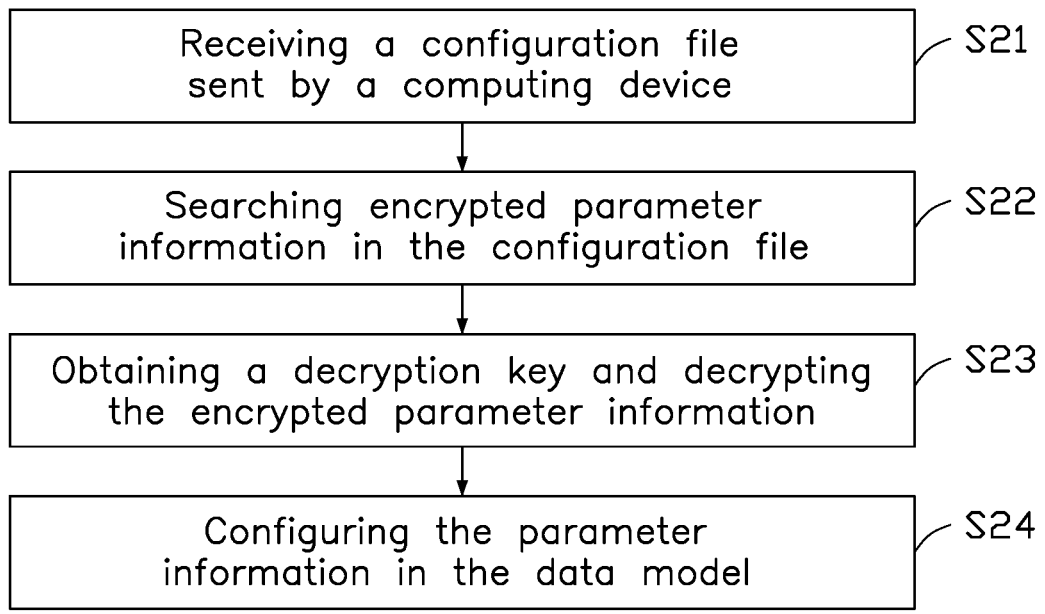
FIG. 3 is a flowchart of a second embodiment of a model parameters security protection method applied to a computing device.

FIG. 3 shows a flowchart of a second embodiment of a model parameters security protection method for protecting the security of model parameters of a computing device. According to different needs, the order of blocks in the flowchart can be changed, and some blocks can be omitted or combined.

At block S21, a configuration file sent by the computing device 1 is received.

At block S22, encrypted parameter information is searched in the configuration file.

In one embodiment, the encrypted parameter information is searched in the configuration file through a keyword search in a programming language preset in the security protection device 2.

At block S23, a decryption key is obtained, and the encrypted parameter information is decrypted.

In one embodiment, when the encryption method utilizes an asymmetric encryption mode, a method of obtaining the decryption key and decrypting the parameter information may include receiving a decryption key sent by the computing device 1 and decrypting the parameter information using the decryption key.

In one embodiment, when the encryption method utilizes a symmetric encryption mode, the method of obtaining the decryption key and decrypting the parameter information may include searching a preset decryption program for decrypting the encrypted parameter information.

At block S24, the parameter information is configured in the data model.

In one embodiment, block S24 may include:

Obtaining position information of the parameter in a parameter and parameter position comparison table of the data model, wherein the parameter and parameter position comparison table is prestored in the security protection device 2, and the parameter and parameter position comparison table includes a type and purpose of the data model, a parameter name required by the data model, and position information of the parameter;

Determining the parameter name corresponding to the position information in the data model, and searching for a corresponding decryption parameter in the decrypted parameter information according to the parameter name; and Loading the decryption parameter into a position corresponding to the position information in the data model.

It should be understood that the embodiments are only for illustrative purposes, and are not limited by the structure described in the scope of the application.

Figure 4:
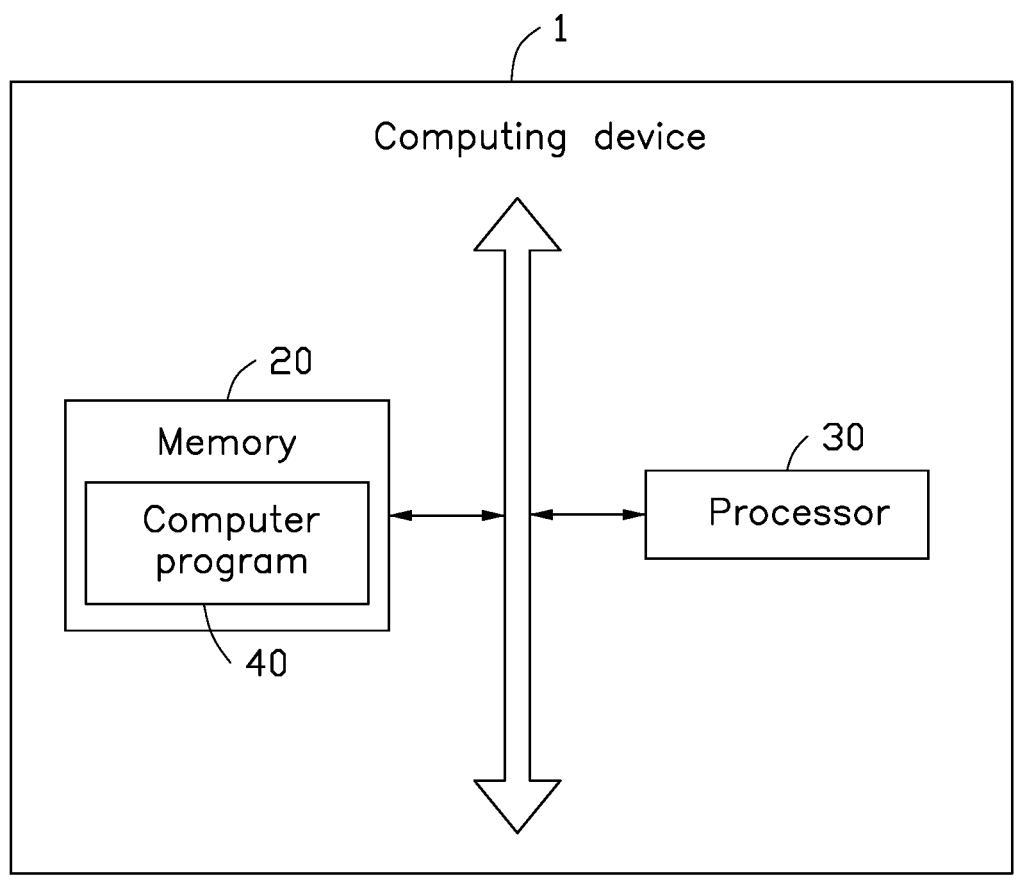
FIG. 4 is a schematic diagram of a computing device.

FIG. 4 is a schematic block diagram of a computing device 1. The computing device 1 includes a memory 20, a processor 30, and a computer program 40. The computer program 40 is stored in the memory 20 and can be executed by the processor 30. When the processor 30 executes the computer program 40, the blocks in the first embodiment of the model parameters security protection method illustrated in FIG. 2 may be implemented. Alternatively, the blocks in the second embodiment of the model parameters security protection method illustrated in FIG. 3 may be implemented.

The computing device 1 may include more or fewer components than those shown in FIG. 4. For example, the computing device 1 may also include input and output devices, network access devices, buses, and so on.

The processor 30 may be a central processing unit, other general-purpose processors, digital signal processors, application specific integrated circuits, Field-Programmable Gate Arrays, or other programmable logic devices, discrete gates or transistor logic devices, discrete hardware components, etc. The processor 30 is a control center of the computing device 1, and is connected by various interfaces and lines to all parts of the computing device 1.

The memory 20 may be used to store the computer program 40, and the processor 30 runs or executes the computer program 40 stored in the memory 20 to implement various functions of the computing device 1. The memory 20 may mainly include a program storage area and a data storage area. The program storage area may store an operating system and an application program required by at least one function (such as a sound playback function, an image playback function, etc.). The data storage area may store data (such as audio data, phone book, etc.) created according to the use of the computing device 1 and the like. In addition, the memory 20 may include a high-speed random access memory, and may also include a non-volatile memory, such as a hard disk, a memory, a plug-in hard disk, a smart memory card, a secure digital card, a Flash Card, at least one magnetic disk storage device, flash memory device, or other volatile solid-state storage device.

The computer program can be stored in a computer-readable storage medium. When the computer program is executed by the processor, it can implement the steps of the foregoing method embodiments. The computer program includes computer program code, and the computer program code may be in the form of source code, object code, executable file, or some intermediate forms. The computer-readable medium may include any entity or device capable of carrying the computer program code, recording medium, U disk, mobile hard disk, magnetic disk, optical disk, computer memory, read-only memory, Random Access Memory, electrical carrier signal, telecommunications signal, and software distribution media. It should be noted that the content contained in the computer-readable medium can be appropriately added or deleted according to the requirements of the legislation and patent practice in the jurisdiction. For example, in some jurisdictions, according to the legislation and patent practice, the computer-readable medium does not include electrical carrier signals and telecommunication signals.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A model parameters security protection method implementable in a computing device in communication connection with at least one security protection device, the method comprising:
   training a data model based on an artificial neural network using a plurality of images and obtaining a set of parameter information of the data model, the set of parameter information comprising at least one of a weight of neuron and an offset value of the neuron of the artificial neural network;
   determining an accuracy of a model prediction;
   in response that the accuracy of the model prediction is equal to or greater than a preset threshold, extracting the weight of the neuron and the offset value of the neuron of the artificial neural network according to position information of the neuron;
   acquiring the plurality of images with feature information;
   dividing the plurality of images into a training set and a verification set;
   establishing the data model based on an artificial neural network, and applying the training set to train the data model based on the artificial neural network;
   verifying the data model according to the verification set based on the artificial neural network, and obtaining a model prediction accuracy based on a verification result;
   encrypting the set of parameter information and generating a configuration file comprising a set of encrypted parameter information; and
   sending the configuration file to the at least one security protection device.

2. The model parameters security protection method of claim 1, wherein training the data model based on the artificial neural network using the plurality of images further comprises:
   in response that the accuracy of the model prediction is less than the preset threshold, adjusting the weight of the neuron and the offset value of the neuron of the artificial neural network, and retraining the data model according to the training set;
   verifying the retrained data model according to the verification set, and obtaining the accuracy of the model prediction according to a verification result of the retrained data model, and determining whether the accuracy of the model prediction of the retrained data model is less than the preset threshold;
   in response that the accuracy of the model prediction of the retrained data model is equal to or greater than the preset threshold, extracting the adjusted weight of the neuron and the offset value of the neuron of the artificial neural network according to position information of the neuron;
   in response that the accuracy of the model prediction of the retrained data model is less than the preset threshold, repeating the retraining process until the model prediction accuracy is greater than the preset threshold.

3. The model parameters security protection method of claim 1, wherein encrypting the set of parameter information and generating the configuration file comprising the set of encrypted parameter information comprises:
   binarizing the set of parameter information; and
   encrypting the set of parameter information which is binarized through an algorithm of a compiler.

4. The model parameters security protection method of claim 1, further comprising:
   receiving request information sent by the security protection device to send the configuration file;
   determining whether the security protection device has access privilege to the configuration file according to account information of the security protection device; and
   in response that the security protection device has access privilege, sending the configuration file to the security protection device.

5. A model parameters security protection method implementable in a security protection device in communication with a computing device, the method comprising:
   receiving a configuration file sent by the computing device;
   searching encrypted parameter information in the configuration file;
   obtaining a decryption key and decrypting the encrypted parameter information using the decryption key; and
   configuring the parameter information in a data model;
   obtaining position information of a parameter and parameter position comparison table of the data model;
   determining a parameter name corresponding to the position information in the data model, and searching for a corresponding decryption parameter in the decrypted parameter information according to the parameter name; and
   loading the decryption parameter into a position corresponding to the position information in the data model;
   wherein:
   the parameter and parameter position comparison table are prestored in the security protection device.

6. The model parameters security protection method of claim 5, wherein obtaining the decryption key comprises:

receiving the decryption key sent by the computing device.

7. The model parameters security protection method of claim 5, wherein obtaining the decryption key and decrypting the parameter information comprises:
   searching a preset decryption program for decrypting the encrypted parameter information.

8. A computing device comprising:
   a processor; and
   a memory storing a plurality of instructions, which when executed by the processor, cause the processor to:
      train a data model based on an artificial neural network using a plurality of images and obtain a set of parameter information of the data model, the set off parameter information comprising at least one of a weight of neuron and an offset value of the neuron of the artificial neural network;
   determining an accuracy of a model prediction;
   in response that the accuracy of the model prediction is equal to or greater than a preset threshold, extracting the weight of the neuron and the offset value of the neuron of the artificial neural network according to position information of the neuron;
   acquire the plurality of images with feature information;
   divide the plurality of images into a training set and a verification set;
   establish the data model based on an artificial neural network, and use the training set to train the data model based on the artificial neural network;
   verify the data model according to the verification set based on the artificial neural network, and obtain a model prediction accuracy based on a verification result;
      encrypt the set of parameter information and generate a configuration file comprising a set of encrypted parameter information; and
      send the configuration file to at least one security protection device.

9. The computing device of claim 8, wherein train the data model based on the artificial neural network using the plurality of images further comprises:
   in response that the accuracy of the model prediction is less than the preset threshold, adjusting the weight of the neuron and the offset value of the neuron of the artificial neural network, and retraining the data model according to the training set;
   verifying the retrained data model according to the verification set, and obtaining the accuracy of the model prediction according to a verification result of the retrained data model, and determining whether the accuracy of the model prediction of the retrained data model is less than the preset threshold;
   in response that the accuracy of the model prediction of the retrained data model is equal to or greater than the preset threshold, extracting the adjusted weight of the neuron and the offset value of the neuron of the artificial neural network according to position information of the neuron;
   in response that the accuracy of the model prediction of the retrained data model is less than the preset threshold, repeating the retraining process until the model prediction accuracy is greater than the preset threshold.

10. The computing device of claim 8, wherein the processor encrypts the set of parameter information and generates the configuration file comprising the set of encrypted parameter information by:
   binarizing the set of parameter information; and
   encrypting the set of parameter information which is binarized through an algorithm of a compiler.

11. The computing device of claim 8, wherein the processor is further configured to:
   receive request information sent by the security protection device to send the configuration file;
   determine whether the security protection device has access privilege to the configuration file according to account information of the security protection device; and
   in response that the security protection device has access privilege, send the configuration file to the security protection device.

* * * * *